(12) United States Patent
Palm

(10) Patent No.: US 9,235,295 B2
(45) Date of Patent: Jan. 12, 2016

(54) VEHICLE GRAPHICAL USER INTERFACE ARRANGEMENT

(71) Applicant: VOLVO CAR CORPORATION, Gothenburg (SE)

(72) Inventor: Samuel Palm, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 291 days.

(21) Appl. No.: 13/939,690

(22) Filed: Jul. 11, 2013

(65) Prior Publication Data

US 2014/0015808 A1 Jan. 16, 2014

(30) Foreign Application Priority Data

Jul. 12, 2012 (EP) ..................................... 12176169

(51) Int. Cl.
*G06F 3/043* (2006.01)
*G06F 3/01* (2006.01)
*B60K 35/00* (2006.01)
*G06F 3/0486* (2013.01)
*B60K 37/06* (2006.01)

(52) U.S. Cl.
CPC ............... *G06F 3/043* (2013.01); *B60K 35/00* (2013.01); *B60K 37/06* (2013.01); *G06F 3/017* (2013.01); *G06F 3/0486* (2013.01); *B60K 2350/1028* (2013.01)

(58) Field of Classification Search
CPC ............ G09G 5/00; G09G 5/08; G06F 3/043; G06F 3/017
USPC .......................................... 345/177, 173, 156
See application file for complete search history.

(56) References Cited

U.S. PATENT DOCUMENTS

| 6,243,080 | B1 * | 6/2001 | Molne ........................... 345/173 |
|---|---|---|---|
| 2004/0056839 | A1 | 3/2004 | Yoshihara |
| 2008/0211779 | A1 | 9/2008 | Pryor |
| 2009/0144622 | A1 | 6/2009 | Evans et al. |

OTHER PUBLICATIONS

Lee et al. Proceedings of the 22nd British HCI Group Annual Conference on People and Computers: Culture, Creativity, Interaction—BCS-HCI, Sep. 1, 2008, p. 185-192, "Assessing the Benefits of Multimodal Feedback on Dual-Task Performance under Demanding Conditions."
Website http://www/ixda.org/node/21871 Tannfors., Feb. 6, 2010, 3 Pages, Retrieved on Jul. 15, 2013, "Auditive/Haptic feedback—good for car touch screens?"
Extended European Search Report for EP 12176169.6, Completed by the European Patent Office on Nov. 20, 2012, 9 Pages.

* cited by examiner

*Primary Examiner* — Fred Tzeng
(74) *Attorney, Agent, or Firm* — Brooks Kushman P.C.

(57) ABSTRACT

A vehicle graphical user interface arrangement is provided including a touch screen and a control unit. The graphical user interface arrangement is arranged to allow for at least two different modes of manipulation of control objects presented on the touch screen, including at least a first manipulation mode including a dragging of a control object across the touch screen, and at least a second manipulation mode including a dropping of a control object at a predetermined location at the touch screen. The control unit is further arranged to cause an acoustic unit to, in response to the second manipulation mode, emit a first acoustic signal. The present disclosure also relates to a touch screen unit including such arrangement and a vehicle comprising such arrangement.

12 Claims, 1 Drawing Sheet

VEHICLE GRAPHICAL USER INTERFACE ARRANGEMENT

CROSS-REFERENCE TO RELATED APPLICATIONS

This application claims priority to European Patent Application No. 12176169.6 filed Jul. 12, 2012, the disclosure of which is incorporated in its entirety by reference herein.

TECHNICAL FIELD

The present disclosure relates to a vehicle graphical user interface arrangement. The present disclosure also relates to a touch screen comprising such an arrangement and a vehicle comprising such a touch screen.

BACKGROUND

Control arrangements in the form of touch screens comprising vehicle graphical user interface arrangements are currently for sale in some vehicles. Via such an arrangement a user may control settings, options and/or functions in different systems or units in a vehicle, hosting the arrangement. Examples of such vehicle systems or vehicle units being controlled via such an arrangement are air-conditioner systems, audible units, and/or vision systems such as parking aids, navigation systems etc. The document US 20090144622 A1 shows a touch screen arranged in a vehicle via which a user may control settings, options and/or functions in different systems or units of the vehicle. A drawback with a vehicle-mounted touch screen is that it may affect a driver's visual focus on the road. That is, from a safety-perspective, it is an advantage if a human-machine interface of a control arrangement comprising a touch screen can be arranged in such a way that it allows the driver to maintain a good visual focus on the road, even during interaction with the control arrangement. Therefore, in comparison with prior-art solutions, there is a need for an arrangement allowing a driver to maintain a good visual focus on the road when interacting with the arrangement.

SUMMARY

An object of the present disclosure is to provide a vehicle graphical user interface arrangement that can be used in an intuitive way and which allows a driver to maintain a good visual focus on the road during interaction with the arrangement.

According to an aspect of the disclosure, the object is achieved by a vehicle graphical user interface arrangement comprising:
a touch screen;
a control unit; and
an acoustic unit.

The graphical user interface arrangement is arranged to allow for at least two different modes of manipulation of control objects presented on the touch screen comprising at least a first manipulation mode including a dragging of a control object across the touch screen, and at least a second manipulation mode including a dropping of a control object at a predetermined location at the touch screen. The control unit is further arranged to cause the acoustic unit to, in response to the second manipulation mode, emit a first acoustic signal.

Since the arrangement allows for at least two modes of manipulation of control objects comprising a dragging and dropping of a control object at a predetermined location at the touch screen, and the first acoustic signal is emitted, in response to the dropping of a control object at the predetermined location, the arrangement can be used in an intuitive way and allows the driver to maintain a good visual focus on the road during interaction with the arrangement. As a result, the above mentioned object is achieved.

The vehicle may be an automotive vehicle, such as an automobile, a bus, or a truck.

According to some embodiments the touch screen may comprise a touch screen previously known in the state of the art, i.e. a LED-touch screen being arranged to sense a surface of the touch screen being touched by a user of the arrangement.

According to some embodiments, the control unit may be further arranged to cause the acoustic unit to, in response to the first manipulation mode, emit a second acoustic signal. That is, the control unit may be arranged to cause the acoustic unit to emit the second acoustic signal during a dragging of a control object across the touch screen. Thereby, a user may be alerted that the control object is being dragged across the touch screen. Hence, the user is allowed to maintain a good visual focus on the road even when performing the first manipulation mode.

As easily understood by those skilled in the art, in the embodiments described, the second acoustic signal is emitted prior to the first acoustic signal when a control object is being dragged across the touch screen and then being dropped at a predetermined location.

According to some embodiments, a third manipulation mode includes a dragging of a control object across the touch screen to a predetermined location at the touch screen, the control unit being further arranged to cause the acoustic unit to, in response to the third manipulation mode, emit a third acoustic signal. That is, the control unit may be arranged to cause the acoustic unit to emit a third acoustic signal in response to a control object being dragged across the touch screen to a predetermined location. Thereby, a user may be alerted that the control object is being dragged across the touch screen to a predetermined location. Hence, the user is allowed to maintain a good visual focus on the road even when performing the third manipulation mode.

According to some embodiments, a fourth manipulation mode includes an expanding of a control object to present further subordinate control objects, the control unit being further arranged to cause the acoustic unit to, in response to the fourth manipulation mode, emit a fourth acoustic signal. Thereby, a user may be alerted that the control object is being expanded to present further subordinate control objects. Hence, the user is allowed to maintain a good visual focus on the road even when performing the fourth manipulation mode.

Control objects, subordinate control objects, and/or predetermined locations at the touch screen may represent options, and/or menu steps covering options, associated with one or more aspects of the vehicle, hosting the vehicle graphical user interface arrangement. Thereby, a user of the arrangement may, via manipulation of objects, control one or more aspects of the vehicle.

Further features of, and advantages with, the present disclosure will become apparent when studying the appended claims and the following detailed description. Those skilled in the art will realize that different features of the present disclosure may be combined to create embodiments other than those described in the following, without departing from the scope of the present disclosure, as defined by the appended claims.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

The present disclosure will now be described more fully with reference to the accompanying drawings, in which example embodiments are shown. Like numbers refer to like elements throughout.

Well-known functions or constructions will not necessarily be described in detail for brevity and/or clarity.

Figure 1:
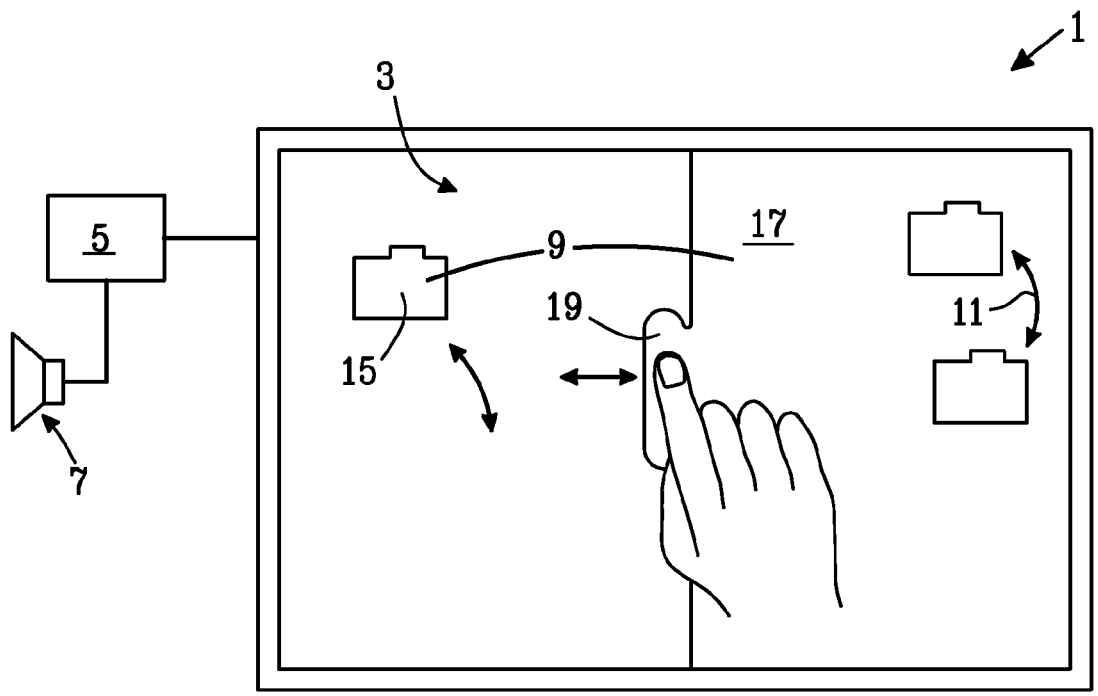
FIG. 1 illustrates a vehicle graphical user interface arrangement 1 according to some embodiments.

FIG. 1 illustrates a vehicle graphical user interface arrangement 1 according to some embodiments. The vehicle graphical user interface arrangement 1 comprises a touch screen 3, a control unit 5, and an acoustic unit 7. The graphical user interface arrangement 1 is arranged to allow for at least two different modes of manipulation of control objects 9 presented on the touch screen 3 comprising at least a first manipulation mode including a dragging of a control object 9 across the touch screen 3, and at least a second manipulation mode including a dropping of a control object 9 at a predetermined location at the touch screen 3. The control unit 5 is further arranged to cause the acoustic unit 7 to, in response to the second manipulation mode, emit a first acoustic signal. Thereby, a user of the arrangement 1 is allowed to maintain a good visual focus on the road when interacting with the arrangement 1.

The control unit 5 is in communication with the touch screen 3, the acoustic unit 7 and with one or more vehicle systems or vehicle units. The acoustic unit 7 may comprise a speaker unit arranged to emit acoustic signals and sounds. The acoustic unit 7 may be comprised in a vehicle audio unit used for music/entertainment, or an acoustic unit being separated from the vehicle audio unit. The control unit 5 may comprise a processing unit, e.g. a processor. The control unit 5 may comprise two or more processing units, e.g. processors.

The control unit 5 is in communication with the touch screen 3 such that the control unit 5 is able to detect the touch screen 3 being touched by a user of the arrangement 1. Further, the arrangement 1 is arranged to allow for at least two different modes of manipulation of control objects 9 presented on the touch screen 3 comprising at least a first manipulation mode including a dragging of a control object 9 across the touch screen 3, and at least a second manipulation mode including a dropping of a control object 9 at a predetermined location at the touch screen 3. That is, a user of the arrangement may select one control object 9 by a touching on the touch screen 3 in a region of the object 9. A user may further perform the first manipulation mode via a swipe movement touch on the touch screen 3 to thereby drag the control object 9 across the touch screen 3. The second manipulation mode may be performed by a user of the arrangement through removing the touch on the touch screen 3 at a location at the touch screen 3 to thereby drop the control object 9 at the location of the touch screen 3. Alternatively, the second manipulation mode may be performed by a user dragging the control object 9 to the predetermined location at the touch screen 3, wherein the control unit 5 drops the control object 9 if/when the control object 9 has reached the predetermined location at the touch screen 3. Accordingly, the dropping of a control object 9 at a predetermined location at the touch screen 3 may be performed by the user removing a touch and/or by the control unit 5 detecting the control object 9 being positioned at the predetermined location at the touch screen 3.

The control unit 5 is arranged to cause the acoustic unit 7 to emit a first acoustic signal, if/when a control object 9 is dropped at a predetermined location at the touch screen 3. Thereby, a user is alerted that the control object 9 has been dropped at the predetermined location at the touch screen 3. Hence, the user is allowed to have a good visual focus on the road even when performing the second manipulation mode since the user is alerted about the dropping at the predetermined location, without having to view the touch screen 3.

According to some embodiments, the control unit 5 may be further arranged to cause the acoustic unit 7 to, in response to the first manipulation mode, emit a second acoustic signal. As easily understood by those skilled in the art, in the embodiments described, the second acoustic signal is emitted prior to the first acoustic signal when a control object 9 is being dragged across the touch screen 3 and then being dropped at a predetermined location. The first acoustic signal may be perceivable different from the second acoustic signal with respect to frequency, sound pressure and/or acoustic pattern, or perceivable as the same acoustic signal with respect to frequency, sound pressure and/or acoustic pattern. In embodiments wherein the first acoustic signal is perceivable different from the second acoustic signal with respect to frequency, sound pressure and/or acoustic pattern, a user may separate between the respective acoustic signals to thereby recognize the manipulation mode being performed. Thereby, the user may be allowed to maintain a good visual focus on the road.

According to some embodiments, a third manipulation mode includes a dragging of a control object 9 across the touch screen to a predetermined location at the touch screen 3, the control unit 5 being further arranged to cause the acoustic unit 7 to, in response to the third manipulation mode, emit a third acoustic signal. That is, the control unit 5 may be arranged to cause the acoustic unit 7 to emit a third acoustic signal in response to a control object 9 being dragged across the touch screen 3 to a predetermined location.

The predetermined location may be the same location at the touch screen 3 as the predetermined location utilized in the second manipulation mode, or a location at the touch screen 3 being different from the predetermined location utilized in the second manipulation mode. In embodiments wherein the second and the third manipulation mode utilizes the same predetermined location at the touch screen 3, a user may drag a control object 9 across the touch screen 3, wherein the control unit 5 may cause the acoustic unit 7 to emit the second acoustic signal in response to the dragging of the control object 9. Then, when a user has dragged the control object 9 to the predetermined location at the touch screen 3, the control unit 5 may cause the acoustic unit 7 to emit the third acoustic signal upon a reaching to the predetermined location with the control object 9. Then, if the user chooses to drop the control object 9 at the predetermined location, the control unit 5 may cause the acoustic unit 7 to emit the first acoustic signal upon the dropping of the control object 9 at the predetermined location at the touch screen 3. Thus, as easily understood by those skilled in the art, in the procedure described above, the control unit 5 causes the acoustic unit 7 to emit the acoustic signals in the following sequence; second acoustic signal, first acoustic signal and third acoustic signal, since the modes of manipulation of the control object 9 is performed in the following sequence; first, second and third.

The third acoustic signal may be perceivable different from the first and second acoustic signal with respect to frequency, sound pressure and/or acoustic pattern, or perceivable as the same acoustic signal as both of, or one of, the first or the second acoustic signals. In embodiments where the first acoustic signal is perceivable different from the first and the second acoustic signals with respect to frequency, sound pressure and/or acoustic pattern, a user may separate the respective acoustic signal to thereby recognize the manipulation mode being performed. Thereby, the user may be allowed to maintain a good visual focus on the road.

Control objects 9 presented on the touch screen may represent options, and/or menu steps covering options, associated with one or more aspects of the vehicle, hosting the vehicle graphical user interface arrangement. Thereby, a user of the arrangement may, via manipulation of objects, control one or more aspects of the vehicle.

Also, one or more predetermined locations at the touch screen 3 may represent options and/or menu steps covering options associated with one or more aspects of the vehicle. A predetermined location at the touch screen 3 may be defined as a region, or an area of the touch screen 3. The dropping of a control object 9, and/or the first acoustic signal may indicate to a user that a task is competed. According to some embodiments, the predetermined location at the touch screen 3 utilized in the second and/or third manipulation mode may represent options and/or menu steps covering options associated with one or more aspects of the vehicle. An aspect referred to above may be related to at least an aspect, and/or a value representative of an aspect, retrieved from, and/or a condition sensed in, a vehicle system or a vehicle unit. Such vehicle system or vehicle unit may comprise a vehicle engine, a vehicle engine management unit, an engine control unit, an air conditioner unit, a vehicle velocity sensing unit, a vehicle position sensing unit, an accelerometer, a navigation unit, a vehicle receiver unit, a vehicle transmitter unit, a tire air pressure sensing unit, an infotainment unit, a stereo unit, a trip computer unit, an imaging unit, such as a camera system, a collision avoidance system, a seat position controlling unit, a side mirror controlling unit, and/or a seat massage controlling unit. Thus, a user may, via manipulation of control objects 9, control one or more of such vehicle systems or vehicle units.

According to some embodiments, a fourth manipulation mode includes an expanding of a control object 9 to present further subordinate control objects 11, the control unit 5 being further arranged to cause the acoustic unit 7 to, in response to the fourth manipulation mode, emit a fourth acoustic signal. The expanding of a control object 9 may be achieved by a user double tapping on the touch screen 3 in a region of the control object 9 or by the user dragging the control object 9 to a predetermined location at the touch screen.

The fourth acoustic signal may be perceivable different from the first, second and/or third acoustic signals with respect to frequency, sound pressure and/or acoustic pattern, or perceivable the same acoustic signal as both of, or one of the first, second and/or third acoustic signals. In embodiments wherein the first acoustic signal is perceivable different from the first, second and third acoustic signals with respect to frequency, sound pressure and/or acoustic pattern, a user may separate the respective acoustic signal to thereby recognize the manipulation mode being performed. Thereby, the user may be allowed to maintain a good visual focus on the road.

The control object 9 may comprise an icon 15 or a menu tab 17. Such icon 15 and/or menu tab 17 may represent options, and/or menu steps covering options, associated with one or more aspects of the vehicle, hosting the vehicle graphical user interface arrangement 1. In embodiments wherein the control object 9 comprises an icon 15, a user may select the icon 15 via a touch on the touch screen 3 in a region of the icon 15 displayed. Then, when the icon 15 is selected, the user may perform the first, the second, the third and/or the fourth mode manipulation of the icon 15. In response to these manipulation modes, the control unit 5 may cause the acoustic unit to emit the second, the first, the third and/or the fourth acoustic signal. Thereby, a user of the arrangement 1 is allowed to maintain a good visual focus on the road when interacting with the arrangement 1. In embodiments where the control object 9 comprises an icon 15, a user may perform the fourth manipulation mode by a tapping, e.g. a double tapping, in a region of the icon 15 displayed on the touch screen 3 to thereby expand the icon 15 to present further subordinate control objects. The expanding of the icon may comprise the opening of a window presenting further subordinate control objects, or a window presenting information related to an aspect, and/or a value representative of an aspect, retrieved from, and/or a condition sensed in a system or unit of the vehicle hosting the arrangement 1.

In embodiments where the control object 9 comprises a menu tab 17, a user may select the menu tab 17 via a touch on the touch screen 3 in a region of the menu tab 17 displayed. Alternatively, a user may select the menu tab 17 via a touch on the touch screen 3 in a region of a part of the menu tab 17, such as an edge 19 of the menu tab 17 displayed. In order to perform the first manipulation mode, a user may drag the menu tab 17 across the touch screen 3. The dragging of the menu tab 17 may comprise an extension of the menu tab into, or out from, the touch screen 3 in a direction of the dragging. During dragging of the menu tab 17, the control unit 5 may cause the acoustic unit 7 to produce the second acoustic signal. As illustrated in FIG. 1, the menu tab 17 may be draggable in two directions. In these embodiments, the menu tab 17 may be locked from being draggable in any other directions than these two directions. In FIG. 1, the menu tab 17 is illustrated as being draggable in lateral directions. However, according to alternative embodiments, the menu tab 17 may be draggable in only horizontal directions or may be draggable only in directions defined as being anywhere between lateral and horizontal.

When the menu tab 17 has been dragged to the predetermined location at the touch screen 3, the user may perform the second manipulation mode by a removing of the touch on the touch screen 3 at the predetermined location. Alternatively, the control unit 5 may perform the second manipulation mode when the menu tab 17 has been dragged to the predetermined location at the touch screen 3. That is, the control unit 5 may perform a dropping of the menu tab 17 at the predetermined location upon reaching the predetermined location at the touch screen 3 with the menu tab 17. In either case, in response to the second manipulation mode, i.e. in response to dropping of the menu tab 17 at the predetermined location, the control unit 5 is arranged to cause the acoustic unit 7 to emit the first acoustic signal.

According to some embodiments, a fourth manipulation mode includes an expanding of the menu tab 17 to present further subordinate control objects 11, the control unit 5 being further arranged to cause the acoustic unit 7 to, in response to the fourth manipulation mode, emit a fourth acoustic signal. In these embodiments, the expanding of the menu tab 17 may encompass a dragging of the menu tab 17 to the predetermined location at the touch screen 3.

Figure 2:
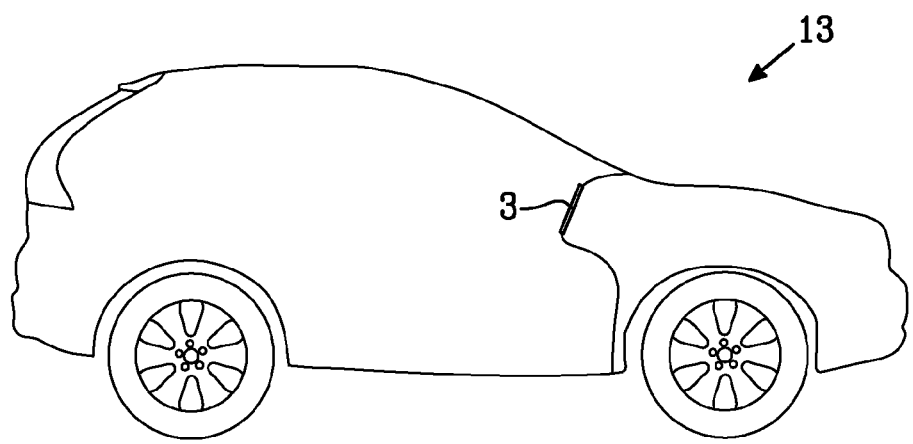
FIG. 2 illustrates a vehicle 13 comprising a touch screen 3 according to some embodiments.

FIG. 2 illustrates a vehicle 13 comprising a touch screen 3 according to some embodiments. The touch screen 3 comprises a vehicle graphical user interface arrangement 1 according to some embodiments. The touch screen 3 may be comprised in a vehicle mounted touch screen unit being arranged to control one or more vehicle systems or vehicle units.

Although the disclosure has been described with reference to example embodiments, many different alterations, modifications and the like will become apparent for those skilled in the art. For instance, one or more of the first, the second, the third and/or the fourth acoustic signal may have a frequency and/or sound pressure resulting in a sound not being perceivable by a human's ear. Also, the graphical user interface arrangement 1 may be arranged to allow for a fifth manipulation mode including a selection of a control object 9 wherein the control unit 5 is arranged to cause the acoustic unit 7 to emit a fifth acoustic signal in response to the fifth manipulation mode. As understood by those skilled in the art, in such embodiments, the fifth acoustic signal is emitted prior to the first acoustic signal. The menu tab 17 referred to may comprise a window, a curtain or similar field displayed on the touch screen 3.

It is to be understood that the foregoing is illustrative of various example embodiments and the disclosure is not to be limited to the specific embodiments disclosed and that modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

What is claimed is:

1. A vehicle graphical user interface arrangement comprising:
   a touch screen;
   a control unit; and
   an acoustic unit;
   wherein the graphical user interface arrangement is arranged to allow for at least two different modes of manipulation of control objects presented on the touch screen comprising at least a first manipulation mode including a dragging of a control object across the touch screen, and at least a second manipulation mode including a dropping of a control object at a predetermined location at the touch screen, and wherein the control unit is arranged to cause the acoustic unit to, in response to the second manipulation mode, emit a first acoustic signal, and wherein the control unit is further arranged to cause the acoustic unit to, in response to the first manipulation mode, emit a second acoustic signal, where the first acoustic signal is different from the second acoustic signal with respect to frequency, sound pressure and/or acoustic pattern.

2. The arrangement according to claim 1 wherein a third manipulation mode includes a dragging of a control object across the touch screen to a predetermined location at the touch screen, the control unit being further arranged to cause the acoustic unit to, in response to the third manipulation mode, emit a third acoustic signal.

3. The arrangement according to claim 2 wherein a fourth manipulation mode includes an expanding of a control object to present further subordinate control objects, the control unit being further arranged to cause the acoustic unit to, in response to the fourth manipulation mode, emit a fourth acoustic signal.

4. The arrangement according to claim 1 wherein a fourth manipulation mode includes an expanding of a control object to present further subordinate control objects, the control unit being further arranged to cause the acoustic unit to, in response to the fourth manipulation mode, emit a fourth acoustic signal.

5. A touch screen unit for a vehicle, the touch screen unit comprising a vehicle graphical user interface arrangement according to claim 1.

6. A vehicle comprising a graphical user interface arrangement according to claim 1.

7. A vehicle graphical user interface arrangement comprising:
   a touch screen; and
   a control unit;
   wherein the graphical user interface arrangement is arranged to allow for at least two different modes of manipulation of control objects presented on the touch screen comprising at least a first manipulation mode including a dragging of a control object across the touch screen, and at least a second manipulation mode including a dropping of a control object at a predetermined location at the touch screen, and wherein the control unit is arranged to cause an acoustic unit to, in response to the second manipulation mode, emit a first acoustic signal, and wherein the control unit is further arranged to cause the acoustic unit to, in response to the first manipulation mode, emit a second acoustic signal, where the first acoustic signal is different from the second acoustic signal with respect to frequency, sound pressure and/or acoustic pattern.

8. The arrangement according to claim 7 wherein a third manipulation mode includes a dragging of a control object across the touch screen to a predetermined location at the touch screen, the control unit being further arranged to cause the acoustic unit to, in response to the third manipulation mode, emit a third acoustic signal.

9. The arrangement according to claim 8 wherein a fourth manipulation mode includes an expanding of a control object to present further subordinate control objects, the control unit being further arranged to cause the acoustic unit to, in response to the fourth manipulation mode, emit a fourth acoustic signal.

10. The arrangement according to claim 7 wherein a fourth manipulation mode includes an expanding of a control object to present further subordinate control objects, the control unit being further arranged to cause the acoustic unit to, in response to the fourth manipulation mode, emit a fourth acoustic signal.

11. A touch screen unit for a vehicle, the touch screen unit comprising a vehicle graphical user interface arrangement according to claim 7.

12. A vehicle comprising a graphical user interface arrangement according to claim 7.

\* \* \* \* \*